April 6, 1971 T. K. KELLY ET AL 3,573,938
METHOD AND APPARATUS FOR DEHYDRATING FOOD FOAMS
Filed Aug. 12, 1968 2 Sheets-Sheet 2

INVENTORS
THOMAS KENNETH KELLY
HERBERT JULIUS LIGHT
BY
ATTORNEY

United States Patent Office 3,573,938
Patented Apr. 6, 1971

3,573,938
METHOD AND APPARATUS FOR DEHYDRATING FOOD FOAMS
Thomas Kenneth Kelly, Fairfield, and Herbert Julius Light, Stamford, Conn., assignors to AMF Incorporated, New York, N.Y.
Filed Aug. 12, 1968, Ser. No. 751,821
Int. Cl. A23b 7/02
U.S. Cl. 99—206                              2 Claims

ABSTRACT OF THE DISCLOSURE

Apparatus and method for drying of foam food products on a continuous belt including means for casting the product on the belt, drying means and means for compacting the product while on the belt.

---

The present invention relates to the manufacture of concentrated foods and, in particular, to a method and apparatus for dehydrating the same.

The preparation of concentrated food products is well known and various methods and apparata have been devised to product highly commercial concentrates of such foods as orange juice, tomato juice and similar products. An example of such a system is described in U.S. Patent 3,266,559 granted Aug. 16, 1966 to R. J. Osborne et al. In this patent, a method for preparing a stable foamed food concentrate is disclosed in which the food is first prepared in an aqueous or other solvent slurry, foamed, and cast into a thin sheet on a stainless steel belt. The belt is heated, from below, by direct condensation of steam and from above by heated air to dry it to a moisture content of less than 10%. The product is then removed from the belt to be packaged and sold.

The resultant product is a highly foamed concentration of the food, in particulate size, readily reconstitutable or soluble by re-introduction of the aqueous or solvent vehicle. By and large, such product maintains all the characteristics and advantages of the natural product without being encumbered by the bulk and weight of water or solvent.

Notwithstanding the success of such product and its value as food concentrate, the foamed product formed by this method, and, indeed, by any other method, has a singular, if not too important drawback. The foam particles obtained as a concentrate have a low density and high bulk due to a high degree of entrapped air. This is, of course, desirable from a re-solubility standpoint but not desirable from a packaging or marketing standpoint. Such product requires relatively large packages (primarily glass jars, tin cans or flexible pouches are used) which are not only initially costly but costly to handle and transport.

Attempts have been made to render such products in a denser form. Most attempts have centered about the modification of the foam structure by chemical means in the slurry state. It will be obvious that such techniques can result in an adulterated food product or a poorly foamed (therefore poorly reconstitutable) product. Other attempts have been made to compress the foamed particulate matter after drying has been completed and after the product had been removed from the drying belt. As will be shown hereinafter, such product results in breaking down the foam structure, pebblizing the particles, causing it to lump both in storage and when reconstituted.

It is the primary object of this invention to produce a foamed food concentrate denser than heretofore known and yet of the same or higher degree of solubility than heretofore obtained. Such a product would have the advantage of greater weight per volume and therefore packable in smaller, more economical units.

It is another object of this invention to provide a novel method and means for drying foam food concentrates into relatively dense articles without destruction of the foam structure. Still another object of the present invention is to enhance the appearance of the product and to make it truer in color and aroma to that of the product as in its natural state.

Broadly, the present invention provides that the food slurry be compacted, while still hot, but in essentially dry condition and while the product is still on the drying belt.

The present invention, as well as its objects and advantages, will be clearly apparent from the following description in which reference is made to the accompanying drawings in which.

Figure 1:
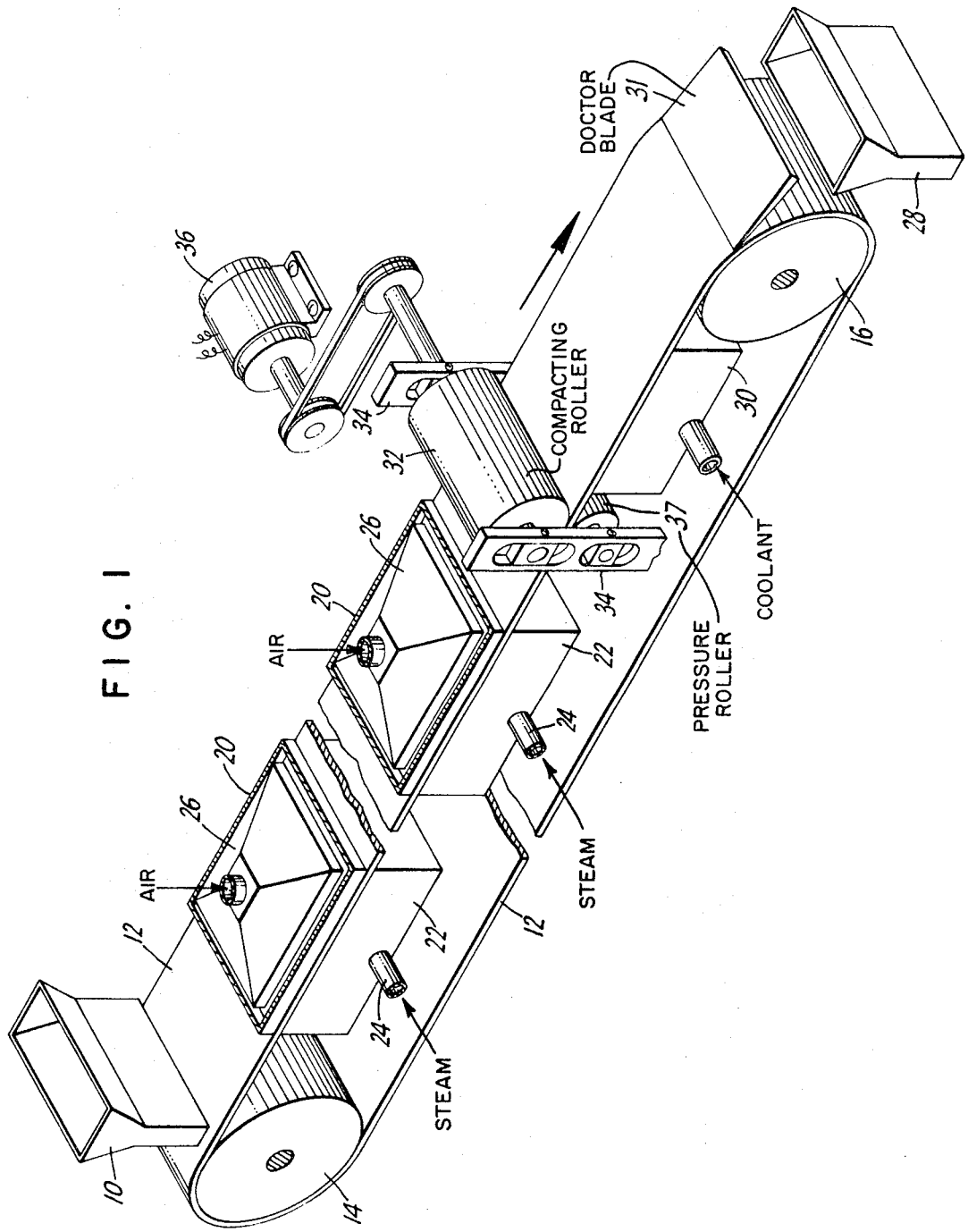
FIG. 1 is a schematic rendering of apparatus employed in the steps of the present invention.

Referring to FIG. 1, a suitable food emulsion or suspension is prepared in accordance with known techniques and deposited within a storage device and casting box 10 from which it is continuously and uniformly fed on to a moving endless belt 12 in a thickness preferably below 100 mils.

The surface 12 is preferably an impervious metal belt of stainless steel which may, if desired, be coated with an anti-sticking material such as silicone, Mylar, etc. The belt is suitably supported by roller drums 14 and 16, one of which is driven by conventional connection to a drive motor, not shown. The food layer is carried by the conveyor 12 through areas 20 which are preferably enclosed from the surrounding space and where drying occurs and the moisture content of the slurry rendered below 10%. To accomplish this, the belt system is provided with one or more independently controlled steam box dryers 22 heating the underside of the belt 12. Steam is supplied through conduits 24 in a controlled manner described in the aforemention Osborne et al. patent. Drying is further enhanced by the employment of circulating air ducts 26 above the belt 12. Upon drying of the product, it may be cooled by application of liquid or air cooling media through the cooler 30 or by an air blast directly on the surface of the food. The product is then removed as it passes over the forward roller 16 and collected in a storage container 28 prior to packaging. A doctor knife 30 may be employed to facilitate removal of the product from the belt 12.

The method and apparatus above described is more fully set forth in the aforementioned Osborne et al. patent and the patent referred to therein. It will be understood that the operation and the steps of the process may be amplified to include all of the details contained in these patents. For the present description, however, it is deemed to be unnecessary to set forth such details here since they merely constitute a selective environment for the present invention.

Figure 2:
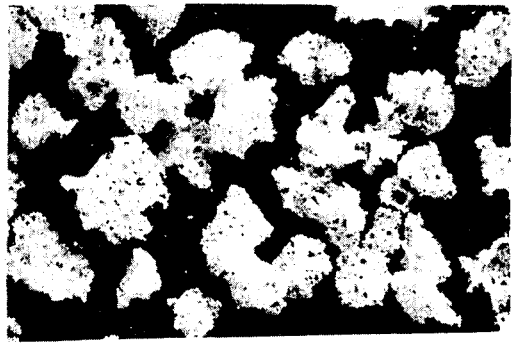
FIG. 2 is a photograph of a food product produced in accordance with the prior art.

Such apparata, as mentioned above, is in common use for the drying of food products, such as orange juice and tomato juice. Typical results of the process is shown in FIG. 2 wherein particles of orange juice is shown in enlarged form. It will be noted that the particles have an open cellular structure of relatively large bulk volume and low density. Such product is highly soluble and reconstitutable but requires large packaging to accomodate its bulk.

In accordance with the present invention, the product is compacted while on the belt and in a hot condition. Accordingly, there is provided a roller 32 mounted above the belt and located outside the area 20 of the last heating zone. The roller 32 may, if desired, be coated with an antisticking agent, silicon, Mylar, etc., or be covered with Mylar or Teflon roll cover. The roller 32 is preferably mounted on vertically adjustable bearings 34 so that its weight and the amount of compaction on the product may be adjusted as desired or required. Suitable guard means and guide means may also be employed to overcome tracking, rubbing or other problems attendant upon the rolling of a drum over an endless belt. A fixed bar or idler roll 37 may be placed on the underside of the belt to permit application of roll pressure uniformly to the product on the top side of the belt.

While the roller 32 is preferably freely rotatable, obtaining its rotary movement from the action of the belt, it may, of course, be driven by motor 36 at speeds equal to or different from the speed of the belt 12.

Figure 3:
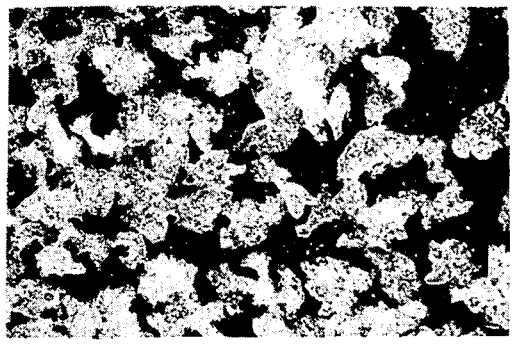
FIG. 3 is a photograph of a food product of the same variety as that of FIG. 1 produced in accordance with the present invention.

As the product passes from the last of the heating zones, it has essentially been reduced in moisture content to the desired dry level. However, it is still hot. Compaction at this point results in producing a product which unexpectedly retains its foam open cellular structure but which takes on an overall flake configuration. FIG. 3 shows the product resulting from compaction of the slurry when hot, on the belt and substantially at the dry moisture content. The product shown in FIG. 3 is orange juice, dried to a moisture content between 1.0–1.5%.

The product obtained by use of the present invention is of course contrasted easily with the non-compacted product produced in accordance with the teachings of the aforementioned patents. Comparing FIG. 2 and 3, it will be seen that the compacted product of FIG. 3 (pressent invention) retains the foam characteristics of the product of FIG. 2 but is denser, darker in appearance and more flaky in structure. The denser particle and its flaky structure result in the advantageous packaging features previously outlined since its greater weight/volume ratios enable it to be packed in smaller containers. Because of its bulk/density ratios more accurate measures may be obtained and individual units may now be produced. Furthermore, advantage is obtained on the consumer level in this respect since more accurate measure of single portions may be had with the cohesive more uniform flaky particle than the large foam non-uniform product. The color change obtained by the present process is totally unexpected. The darker color, probably caused by the greater densification of the product results in a product having a more realistic color, i.e., orange particles are more orange, tomato juice particles more natural and deeper red color.

To further show the advantageous results obtained by the present invention, the product shown in FIG. 3 is contrasted with a product made by compacting the prior art product shown in FIG. 2 (made in accordance with the aforementioned patents) after this product was removed from the belt when dry and cold. The product was rolled between two rollers and resulted in the finished product shown in FIG. 4. It will be seen that the product of FIG. 4 not only has lost its foam characteristics but the particles have agglomerated into large pieces and have retained their light coloration. This product was insoluble by consumer standards and required beating and whipping or an excessively long time to fully reconstitute. The color and the particle size were also not realistic and therefore objectionable.

Figure 4:
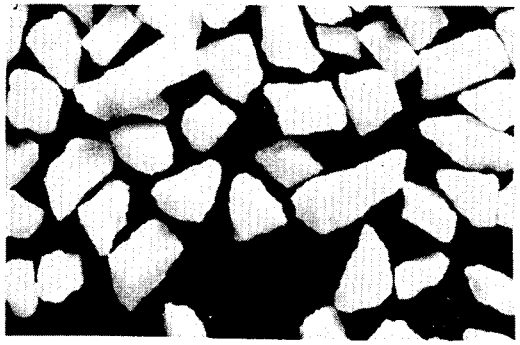
FIG. 4 is a photograph of the same type of food product produced in accordance with the prior art teachings of densification.

All three products shown in FIGS. 2–4 are orange juice. All the photographs have been uniformly enlarged to 10 times normal size and were produced under similar light and exposure values.

Various parameters have been tried to determine the degree of compaction and/or heat required in the present method. It has been found that so long as the product is still hot, the exact temperature or compaction load is not critical. It has been found that temperatures between 50°–150° F. and roll pressures between 100–175 lbs. were to be preferred. The roll pressure here preferred should be contrasted with the 10,000–50,000 lbs. required by the prior art cold compaction.

As an example, orange juice produced in accordance with the teachings of the aforementioned Osborne patent was compacted in accordance with the present teachings. A standard orange junce mixture was foamed, cast on the steel belt and dried in accordance with Osborne and compacted between the final drying and doctoring stage. The product temperature at the roll was 100° F. and the roll force 125 lbs. The final product resembled that shown in FIG. 3 and had the following characteristics:

Product Moisture—1.0–1.5%
Bulk Density—0.5–0.6 g./cc.
Color—Deep Yellow
Particle Size—Irregular, small thin platelets with virtually no fines.
Reconstitution—Excellent, rapid, (under 30 sec.) and complete.
Hygroscopicity—Less caking than uncompacted flakes; (control).

As another example, lemon junice was similarly dried. The final product also resembled in structure that shown in FIG. 3 and had the following characteristics:

Product moisture—1.75%
Buly density—.7 g./cc.
Color—Lemon yellow
Particle—Irregular, small platelets—no fines.
Reconstitution—Excellent
Hygroscopicity—Some lumping on prolonged storage.

It will be observed that there has been here described a novel method and apparatus for improvement of the production of reconstituted foods. The present invention provides an improved food in color, density and reconstitutability as well as producing great economic gains in their packaging and distribution. Various modficatons may be made to both the method and the apparatus herein described and accordingly the prior description is to be taken as illustrative only. It is intended that the scope of this invention be limited solely by the claims appended hereto.

What is claimed is:

1. A method for the dehydration of a liquid food foam on an arrangement including an impervious, metallic conveyor belt comprising the steps of depositing said foam on said conveyor belt in a thin layer, drying said foam to a predetermined moisture content by subjecting the same to a heated gas passed over said foam and impingement of steam on the underside of said conveyor belt compacting said dried foam while on said conveyor belt and while said foam is heated, applying a transverse force to the foam to compact same while it is still hot but not being heated, cooling said foam prior to its removal from the belt, and removing the foam from said belt.

2. Apparatus for dehydrating a liquid food foam comprising a continuous, impervious, metallic conveyor belt, means for depositing said foam on said conveyor belt in a thin layer, steam box means located below said conveyor belt for impingement of steam on the underside of said conveyor belt and circulating ducts positioned above said conveyor belt for circulating a heated gas over said foam and for drying said foam on said conveyor belt, roller means located above said conveyor belt including means for adjusting the position of said roller to compact said foam said roller being positioned at a point where the application of heat has been ended but where the foam still retains its heat, means for cooling said foam after compaction and before removal from said conveyor belt, and means for removing said compacted foam from said conveyor belt.

References Cited

UNITED STATES PATENTS

| | | | |
|---|---|---|---|
| 2,192,041 | 2/1940 | Headland | 99—204 |
| 2,523,552 | 9/1950 | Birdseye | 99—199 |
| 2,981,629 | 4/1961 | Ginnette et al. | 99—206 |
| 2,955,046 | 10/1960 | Morgan Jr. et al. | 99—206 |
| 3,088,220 | 5/1963 | Ofner | 34—17 |
| 3,266,559 | 8/1966 | Osborne et al. | 159—49 |

FOREIGN PATENTS

| | | | |
|---|---|---|---|
| 668,534 | 8/1963 | Canada | 99—199 |

WILBUR L. BASCOMB, JR., Primary Examiner

J. SOFER, Assistant Examiner

U.S. Cl. X.R.

99—240, 246